Patented Mar. 26, 1940

2,194,712

UNITED STATES PATENT OFFICE 2,194,712

ELECTRIC WELDING

Wilber B. Miller, Niagara Falls, N. Y., assignor to Oxweld Acetylene Company, a corporation of West Virginia No Drawing. Application June 11, 1938, Serial No. 213,210

5 Claims. (Cl. 219—8)

This invention relates to electric welding and refers more particularly to welding electrodes for use in electric arc welding and to coatings for such electrodes. This application is in part a continuation of my application Serial No. 167,699 filed October 7, 1937.

The element columbium is frequently added to certain chromium steels containing 2% to 35% chromium, and also to chromium-nickel steels containing 12% to 35% chromium and 6% to 25% nickel, the nickel on occasion being supplemented or replaced in whole or in part by manganese or by manganese and copper. The carbon content of such steels is ordinarily below 0.3%, and most frequently below 0.1%. The columbium content is related to the carbon content, and the desired ratio of columbium to carbon is usually above 6 and frequently above 10. Steels of this class are hereinafter referred to as columbium-containing chromium steels.

An important use of the columbium-bearing chromium steels is in chemical apparatus which may conveniently be fabricated by welding. In order to produce a satisfactory welded joint, it is necessary to prevent an undue loss of columbium and increase of carbon in the electrode metal during the welding operation. If welding is to be done successfully by the arc process, it is also necessary to use an electrode providing a stable arc, a protected arc stream, and a suitable protective flux layer over the deposited molten metal.

It is an object of this invention to provide an electrode coating material and a coated electrode which permit successful electric arc welding of chromium steels, including specifically the columbium-containing chromium steels. This and other objects are successfully attained by the use of the composition described below as a coating material for electrodes having a core of chromium steel, preferably of the columbium-containing chromium steel of the class described above.

The coating material of the invention comprises, in parts by weight, as essential ingredients 20 to 40 parts rutile or an equivalent source of titanium dioxide, 15 to 20 parts clay which is preferably a slip clay, 10 to 30 parts of alkaline earth metal oxide which may conveniently be in the form of carbonate or silicate, 5 to 15 parts of alkaline earth metal fluoride, and 4 to 8 parts metal of the group consisting of silicon and manganese, and a binder. The silicon may be in the form of commercial ferrosilicon, and the manganese may be in the form of low carbon ferromanganese (not over 0.5% carbon). If the ferroalloys are used, suitable proportions are between 5 and 10 parts. If desired, up to about 6 parts of columbium, suitably in the form of ferrocolumbium, may be added. It will sometimes be advantageous to use a calcium titanate or calcium titanosilicate as the source of part or all of the calcium. Any suitable binder may be used, and I have found that about one part of sodium silicate solution of commercial strength to about three and one-half parts of the dry welding composition is suitable.

A preferred composition contains, on a dry basis, 30 parts titanium oxide, 20 parts slip clay, 14 parts calcium oxide, 10 parts calcium fluoride, 10 parts low carbon ferromanganese or 5 parts ferrosilicon, 4 parts ferrocolumbium, and a binder.

When the calcium or titanium, or both, is added in the form of a silicate, the proportion of slip clay may be decreased to compensate for the silicon dioxide thus introduced.

I claim:

1. A coating material, for electric arc welding electrodes comprising a wire core of chromium steel, comprising 20 to 40 parts titanium dioxide, 15 to 20 parts clay, 10 to 30 parts alkaline earth metal oxide, 5 to 15 parts alkaline earth metal fluoride, 4 to 8 parts metal of the group consisting of silicon and manganese, and a binder.

2. A coating material, for electric arc welding electrodes comprising a wire core composed of chromium steel, comprising 20 to 40 parts titanium dioxide, 15 to 25 parts slip clay, 10 to 30 parts calcium oxide, 5 to 15 parts calcium fluoride, 5 to 10 parts metal of the group consisting of ferrosilicon and low carbon ferromanganese, and a binder.

3. A coating material as defined in claim 1 and containing columbium in an amount not over 6 parts.

4. A coating material as defined in claim 1 and containing ferrocolumbium in an amount not over 10 parts.

5. A coating material, for electric arc welding electrodes comprising a wire core composed of columbium-containing chromium steels of the class described, having the composition comprising approximately 30 parts titanium dioxide, 20 parts slip clay, 14 parts calcium oxide, 10 parts calcium fluoride, 10 parts low carbon ferromanganese, 4 parts ferrocolumbium, and a binder.

WILBER B. MILLER.